(12) United States Patent
Karthik et al.

(10) Patent No.: US 12,198,213 B2
(45) Date of Patent: Jan. 14, 2025

(54) SYSTEMS AND METHODS FOR PERSONALITY ANALYSIS FOR SELECTION OF COURSES, COLLEGES, AND/OR CAREERS

(71) Applicant: Catenate LLC, Plano, TX (US)

(72) Inventors: Vishwa Karthik, Plano, TX (US); Sameer Ranjan, Richardson, TX (US); Shivakumar Viswanathan, Karnataka (IN); Sandhya Ganesan, Chennai (IN)

(73) Assignee: Catenate LLC, Plano, TX (US)

( * ) Notice: Subject to any disclaimer, the term of this patent is extended or adjusted under 35 U.S.C. 154(b) by 345 days.

(21) Appl. No.: 17/365,227

(22) Filed: Jul. 1, 2021

(65) Prior Publication Data

US 2022/0335555 A1    Oct. 20, 2022

Related U.S. Application Data

(60) Provisional application No. 63/175,908, filed on Apr. 16, 2021.

(51) Int. Cl.
*G06Q 50/20* (2012.01)
*G06N 20/00* (2019.01)
*G06Q 30/0203* (2023.01)

(52) U.S. Cl.
CPC ......... *G06Q 50/2057* (2013.01); *G06N 20/00* (2019.01); *G06Q 30/0203* (2013.01)

(58) Field of Classification Search
CPC . G06Q 50/0257; G06Q 30/0203; G06N 20/00
See application file for complete search history.

(56) References Cited

U.S. PATENT DOCUMENTS 6,341,267 B1   1/2002 Taub
6,519,571 B1   2/2003 Guheen et al.
(Continued)

FOREIGN PATENT DOCUMENTS

CN   108182489 A   6/2018
CN   109086837 A   12/2018
(Continued)

OTHER PUBLICATIONS

Rohit Rastogi et al., "Intelligent Analysis for Personality Detection on Various Indicators by Clinical Reliable Psychological TTH and Stress Surveys," ResearchGate, Jan. 2020.
(Continued)

*Primary Examiner* — Dylan C White
(74) *Attorney, Agent, or Firm* — Ellenoff Grossman & Schole LLP; John C. Stellabotte; Danielle Cohen (57) ABSTRACT

Methods, computer-readable media, software, and career planning system may receive inputs from a user in response to questions related to personality and may provide outputs related to preferences for schooling and other career options, such as courses, colleges, universities, programs, majors, careers, jobs, and/or companies. The personality of the user may be broken into four (or other numbers) different pillars, life vectors, and/or personality characteristics and the user may be provided a score in each of the pillars, life vectors, and/or personality characteristics based on the responses to the questions. These scores for each of the pillars, life vectors, and/or personality characteristics may be then matched to various schooling and career option recommendations for the user.

20 Claims, 6 Drawing Sheets

(56) References Cited

U.S. PATENT DOCUMENTS

| | | | |
|---|---|---|---|
| 8,725,462 B2 | 5/2014 | Jain et al. | |
| 9,471,623 B2* | 10/2016 | Kozloski | G06F 40/205 |
| 9,767,525 B2* | 9/2017 | Geritz | G06Q 50/205 |
| 10,387,837 B1* | 8/2019 | Mund | G06Q 10/105 |
| 10,387,898 B2 | 8/2019 | Frank et al. | |
| 10,423,890 B1 | 9/2019 | Fogarty et al. | |
| 10,572,679 B2 | 2/2020 | Frank et al. | |
| 11,158,016 B2* | 10/2021 | Varga | G06Q 50/2057 |
| 11,227,259 B2* | 1/2022 | Balasia | G06F 16/24578 |
| 11,514,401 B2* | 11/2022 | Polli | G06Q 10/063112 |
| 11,776,080 B2* | 10/2023 | Grau | G06Q 50/2057 705/328 |
| 2002/0002479 A1 | 1/2002 | Almog et al. | |
| 2004/0210661 A1 | 10/2004 | Thompson | |
| 2009/0265224 A1 | 10/2009 | Tarr et al. | |
| 2013/0101970 A1* | 4/2013 | Mascarenhas | G06Q 30/02 434/236 |
| 2013/0108997 A1* | 5/2013 | Wright | G06Q 30/08 434/236 |
| 2014/0074740 A1* | 3/2014 | Phillips | G06Q 50/205 705/328 |
| 2014/0136362 A1 | 5/2014 | Shaya et al. | |
| 2014/0324749 A1 | 10/2014 | Peters et al. | |
| 2015/0248641 A1* | 9/2015 | Bastide | G06Q 10/10 705/328 |
| 2016/0117942 A1* | 4/2016 | Marino | G09B 7/00 434/353 |
| 2016/0196534 A1* | 7/2016 | Jarrett | G06Q 50/2057 705/321 |
| 2016/0275636 A1* | 9/2016 | Olenick | G06F 3/04847 |
| 2017/0235848 A1 | 8/2017 | Van Dusen et al. | |
| 2017/0278208 A1* | 9/2017 | Oni | G06Q 10/10 |
| 2021/0264371 A1* | 8/2021 | Polli | A63F 13/79 |
| 2024/0046393 A1* | 2/2024 | Butsch | G06Q 50/2057 |

FOREIGN PATENT DOCUMENTS

| | | | | |
|---|---|---|---|---|
| CN | 109740861 A | | 5/2019 | |
| EP | 3616619 A1 * | | 3/2020 | ......... A61B 5/1128 |
| WO | WO-2021168254 A1 * | | 8/2021 | ............ A63F 13/79 |

OTHER PUBLICATIONS

Tehseen Mehraj et al., "Scrutinising Artificial Intelligence based Career Guidance and Counselling Systems: an Appraisal," International Journal of Interdisciplinary Research and Innovations, vol. 7, Issue 1, pp. 402-411, Mar. 2019.

Mehdi Elahi et al., "Personality-Based Active Learning for Collaborative Filtering Recommender Systems," ResearchGate, Dec. 2013.

\* cited by examiner

SYSTEMS AND METHODS FOR PERSONALITY ANALYSIS FOR SELECTION OF COURSES, COLLEGES, AND/OR CAREERS

CROSS-REFERENCE TO RELATED APPLICATIONS

The instant application claims priority to U.S. Provisional Patent Application No. 63/175,908, titled "Gamified Personality Program for Selection of Courses, Colleges, and/or Careers" and filed Apr. 16, 2021, the disclosures of which are hereby incorporated by reference in their entirety.

FIELD OF ART

Aspects of the disclosure relate generally to education and career selection, more specifically, receiving inputs from a user in response to questions related to personality and providing outputs related to preferences for schooling and other outputs, such as courses, colleges, universities, programs, majors, careers, jobs, and/or companies.

BACKGROUND

Current personality quizzes, such as Myers Briggs solve self-assessment but do not focus on driving outcomes. Additionally, school/college assessment tests base judgment on academic performances and do not focus on personality traits. Further, human experience management software packages focus on human resources management as opposed to identifying adjacent skills and providing options for growth. The advent of artificial intelligence is quickly forcing skill changes across generations. Not having periodic self-assessment leaves human capital unrealized to its full potential and erroneous judgments may arise from not understanding options of available choices.

Aspects described herein may address these and other problems, and generally providing a comprehensive career planning system using personality assessment and analysis. Aspects described herein may be utilized to engage via a "gamified" interface for continual enrichment of human capital to align skills and provide options for growth. Additionally, aspects described herein may be utilized to advance adjacent knowledge and skills for alignment to changing trends in technology. Further, aspects described herein may be utilized to collaborate and decide career paths and options based on data science and not on opinions. Lastly, aspects described herein may be utilized to build on the foundation of this "learn" stage and build a life deck for career management and career growth throughout a person's entire lifetime.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In some aspects, the system may include: a career planning server; a mobile application connected to the career planning server and executing on a mobile device having at least one processor; and a display with a user interface on the mobile device. The system may also include a memory unit storing computer-executable instructions, which when executed by the processor, cause the system to: receive, by the mobile application, login information from a user; create a personality quiz including a plurality of questions; receive, by the mobile application, the plurality of answers from the answer interface; generate and calculate, using a machine learning algorithm model executing on the career planning server, a score for each of a plurality of personality pillars based on the plurality of answers from the user; scrape, using the machine learning algorithm model executing on the career planning server, a plurality of career planning options from a plurality of websites; match, using the machine learning algorithm model executing on the career planning server, the scores for each of the plurality of personality pillars and the plurality of career planning options; display, on the user interface of the mobile device, the scores for each of the plurality of personality pillars; and display, on the user interface of the mobile device, the plurality of career planning options. The login information may be received through the mobile device. The plurality of questions may include an answer interface with a plurality of answers. The user may rank each of the answers on the user interface by putting each of the answers in a rank order. The user may receive three or more answers that the user rank orders. The plurality of career planning options may include one or more of the following: courses, majors, programs, or colleges.

According to some embodiments, the user may rank order the plurality of answers by moving one or more of the answers up or down on the answer interface. The scores for each of the plurality of personality pillars may be calculated using a standard deviation with a four-factorial calculation. The plurality of personality pillars may include Spirit, Profession, Outlook, and Reward. The displaying of the plurality of career planning options may be filtered using one or more of the following: location, entrance scores, or costs. The plurality of questions may be based on three core components of human behavior that include a sensory component, a feelings component, and a thoughts component. The sensory component may include questions related to sight, sound, smell, taste, and touch. The feelings component may include questions related to joy, anger, sorrow, fear, and disgust. The thoughts component may include questions related to personal experience, adapted experience, influenced thoughts, learned values, and convictions/judgement. Further, the system may calculate and determine a percent confidence level for each of the plurality of career planning options.

The methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims. These features, along with many others, are discussed in greater detail below.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for determining, based on historical vehicle supply data, and based on historical vehicle demand data, that an expected vehicle demand will exceed an expected vehicle supply, and for sending, to at least one user, a request to provide a vehicle for sharing on the determined date.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Aspects of the disclosure address one or more of the issues mentioned above by disclosing methods, computer readable storage media, software, systems, and apparatuses that may receive inputs from a user in response to questions related to personality and characteristics. The methods, computer readable storage media, software, systems, and apparatuses may further provide outputs related to career planning and preferences for schooling and other outputs, such as courses, colleges, universities, programs, majors, careers, jobs, and/or companies, etc. Generally, the career planning systems and methods may provide a decision-enablement tool and a decision aide platform for suggesting and not a decision platform. The career planning systems and methods may provide an assessment of who the user is and/or who do you fit into. The career planning systems and methods may include a career planning application with a workflow of discovery (yourself), choice/comparison (based on the mappings between courses and individual pillars/life vectors), and fulfillment (fulfilling your dreams through actionable steps). The career planning systems and methods may optimally use resources—by the user, career counselors, parents, students, guidance counselors, life coaches, etc. Generally, the career planning systems and methods may provide adapting and continual evaluation and assessment with engagement with the user. The career planning systems and methods may process data and using artificial intelligence with data science to provide recommendations for courses/colleges/jobs/careers, etc.

Generally, the career planning systems and methods may receive inputs from a user in response to questions related to personality and may provide outputs related to preferences for schooling and other career options, such as courses, colleges, universities, programs, majors, careers, jobs, and/or companies. The personality of the user may be broken into four (or other numbers) different pillars, life vectors, and/or personality characteristics and the user may be provided a score in each of the pillars, life vectors, and/or personality characteristics based on the responses to the questions. These scores for each of the pillars, life vectors, and/or personality characteristics may be then matched to the various schooling and career option recommendations to the user. The terms "pillars," "life vectors," and "personality characteristics" may be interchanged throughout and generally are similar in providing these outputs to the user related to schooling and other career options.

Figure 1:
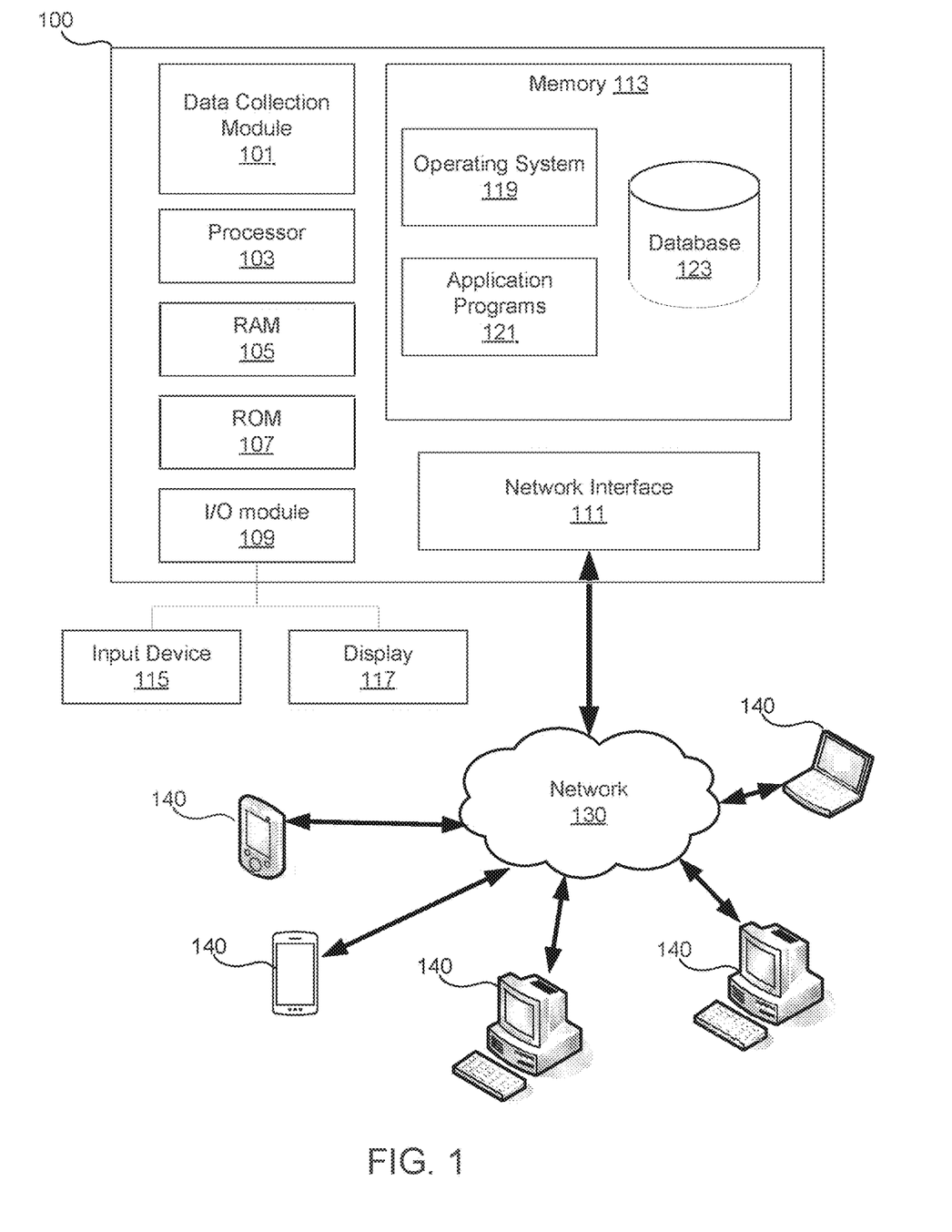
FIG. 1 illustrates an example computing device that may be used in accordance with one or more aspects described herein.

In one or more arrangements, aspects of the present disclosure may be implemented with a computing device. FIG. 1 illustrates a block diagram of an example career planning server 100 that may be used in accordance with aspects described herein. The career planning server 100 may be a server, personal computer (e.g., a desktop computer), laptop computer, notebook, tablet, smartphone, home management devices, home security devices, smart appliances, etc. The career planning server 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware and/or applications used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, career planning server 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the career planning server 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113. Processor 103 may include one or more computer processing units (CPUs), graphical processing units (GPUs), and/or other processing units such as a processor adapted to perform computations associated with machine learning and machine learning algorithms.

The I/O module 109 may be configured to be connected to an input device 115, such as a microphone, keypad, keyboard, touchscreen, and/or stylus through which a user of the career planning server 100 may provide input data. The I/O module 109 may also be configured to be connected to a display device 117, such as a monitor, television, touchscreen, etc., and may include a graphics card. The display device 117 and input device 115 are shown as separate elements from the computing device 100; however, they may be within the same structure. On some computing devices 100, the input device 115 may be operated by users to interact with the data collection module 101, including providing user information and/or preferences, account information, vehicle sharing requests and/or offers, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the computing device 100 to perform various functions. For example, memory 113 may store software used by the career planning server 100, such as an operating system 119 and application programs 121, and may include one or more associated databases 123.

Memory 113 may store software for configuring career planning server 100 into a special purpose computing device in order to perform one or more of the various functions discussed herein. Memory 113 may store operating system software 119 for controlling overall operation of the career planning server 100 or application programs 121 for instructing career planning server 100 to perform aspects discussed herein. A career planning application 221 may be included in the one or more application programs 121.

The network interface 111 may allow the career planning server 100 to connect to and communicate with a network 130. The network 130 may be any type of network, including a local area network (LAN) and/or a wide area network (WAN), such as the Internet, a cellular network, or a satellite network. Through the network 130, the career planning server 100 may communicate with one or more other mobile computing devices 140, such as laptops, notebooks, smartphones, cell phones, tablets, personal computers, in-vehicle devices, servers, vehicles, home management devices, home security devices, smart appliances, etc. The mobile computing devices 140 may be configured to operate software and/or applications. The mobile computing devices 140 may also be configured in a similar manner as career planning server 100. In some embodiments the career planning server 100 may be connected to the mobile computing devices 140 to form a "cloud" computing environment.

Devices 140 may have similar or different architecture as described with respect to the career planning server 100. Those of skill in the art will appreciate that the functionality of the career planning server 100 (or device 140) as described herein may be spread across multiple data processing devices, for example, to distribute processing load across multiple computers, to segregate transactions based on geographic location, user access level, quality of service (QoS), etc. For example, the career planning server 100 and devices 140, and others may operate in concert to provide parallel computing features in support of the operation of operating systems 119 and/or application programs 121.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other mobile computing devices 140.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
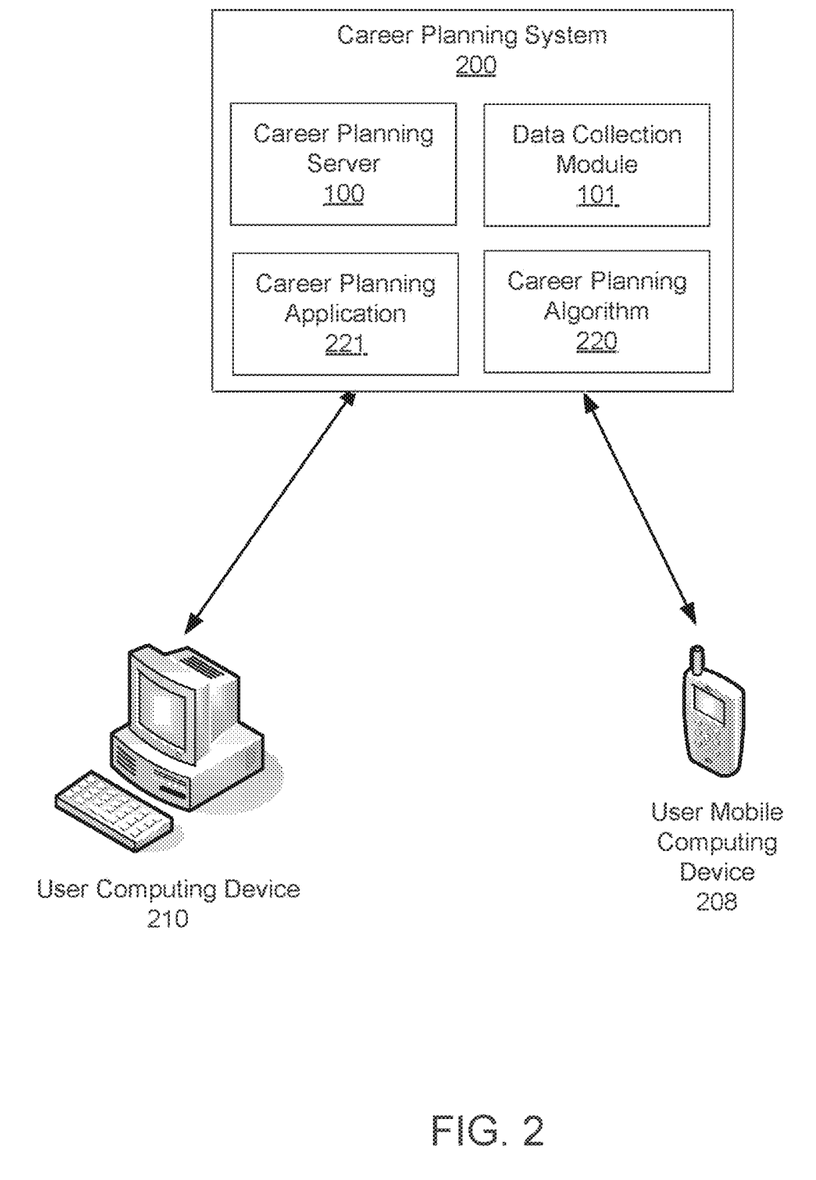
FIG. 2 is a diagram illustrating a career planning system in accordance with one or more aspects described herein.

FIG. 2 is a diagram illustrating a career planning system 200 in accordance with one or more aspects described herein. In some instances, the career planning system 200 may include one or more computing devices, such as career planning server 100 or mobile computing devices 140, or aspects similar to those discussed above with respect to career planning server 100 and mobile computing devices 140. As further illustrated in FIG. 2, the career planning system 200 may include, but not be limited to, the career planning server 100, the data collection module 101, a career planning application 221, and a career planning algorithm 220.

The career planning system 200 may include a career planning application 221 that may execute or operate on the career planning server 100. Additionally, the career planning application 221 may execute or operate on a mobile computing device 208 and/or a user computing device 210.
APPLICATION LANGUAGE The career planning system 200 may include a career planning algorithm 220 that may execute or operate on the career planning server 100. The career planning algorithm 220 may be a machine learning algorithm. The career planning system 200 may utilize the career planning algorithm 220 and machine learning for comparing users to other users in scoring the characteristic pillar results or life vectors, using a "people-like-you" model. The career planning algorithm 220 may utilize machine learning and compare the answers of users to the answers of other users. The career planning algorithm 220 may utilize one or more of a variety of machine learning architectures known and used in the art. These architectures can include, but are not limited to, linear regression, random forest, decision trees, k-nearest neighbors, support vector machines (SVM), logistical regression, k-means clustering, association rules, neural networks (NN), artificial neural networks (ANN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning architectures can be utilized, more specific machine learning architectures when available, and general machine learning architectures at other times can be used. Additionally, the career planning algorithm 220 may use semi-supervised learning and/or reinforcement learning.

The career planning system 200 may collect location data and additional information from a user through various channels, such as via a user mobile computing device 208, or via a user computing device 210 (e.g., via one or more public or private networks). The mobile computing device 208 and the user computing device 210 may be similar to and include the one or more mobile computing devices 140, such as laptops, notebooks, smartphones, cell phones, tablets, personal computers, in-vehicle devices, servers, vehicles, home management devices, home security devices, smart appliances, etc. The career planning application 221 may operate and/or execute on the mobile computing device 208 and the user computing device 210.

Figure 3:
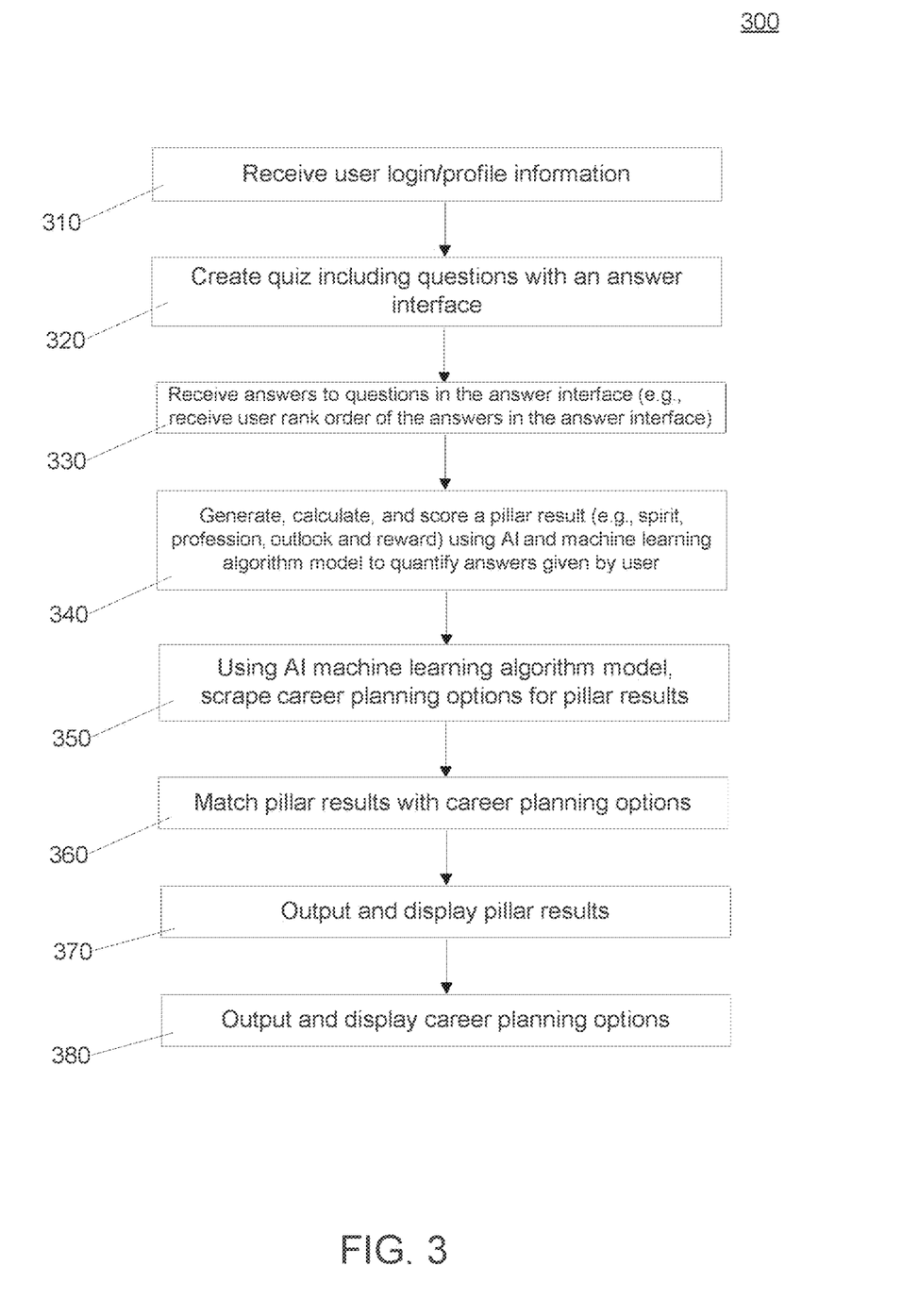
FIG. 3 illustrates an exemplary method for the career planning system in accordance with one or more aspects described herein.

FIG. 3 illustrates and example method 300 according to an embodiment as disclosed herein. In some embodiments, method 300 may be performed by the career planning system 200 and/or the career planning server 100. It should be understood that the method of FIG. 3 is designed to illustrate various features and aspects of the system, and not to limit the functionality of the system.

At step 310, the career planning system 200 and/or the career planning server 100 may receive user login/profile information for a user. The career planning system 200 and/or the career planning server 100 may ask general questions and/or provide a web form to build a personal profile for the users, for example, name, email, gender, age, current school, etc. The user may utilize a career planning application 221 executes or operates on a mobile device or other computing device and is connected to the career planning system 200 and/or the career planning server 100. The career planning application 221 may be a standalone application or a web application that executes as a webpage. The user may enter the user login/profile information into the career planning application 221.

At step 320, the career planning system 200 and/or the career planning server 100 may create one or more sprints or quizzes including questions with an answer interface. A sprint may be defined as a set of questions. A quiz may be defined as a set of sprints. The career planning system 200 and/or career planning server 100 may utilize one or more of questions, springs, and/or quizzes. In an exemplary embodiment, the career planning system 200 and/or career planning server 100 may include questions organized into quizzes, with quizzes organized into sprints. Every sprint may include 20-24 questions, organized along the pillars or life vectors, for example organized along the four life vectors of Spirit, Profession, Outlook, and Reward. The questions in a sprint may be a randomized selection (driven by the AI machine learning algorithm models) from a continuously updated and maintained pool of questions. The questions may be designed and framed to elicit responses along multiple dimensions.

The answer interface may include questions that require the user to rank each of the different answers, putting each of the answers in rank order. The user may utilize the answer interface by clicking on an answer and moving the answer up or down within the list of answers depending on the user's answer rank order. The user may have the ability to re-arrange the order of the answers within a user interface of the career planning application 221 on the display of the mobile device or the computing device.

The questions may be formed and based on three core components driving human behavior. The three core components may be sensory (physiological), feelings (mental), and thoughts (discretionary). The sensory component may include sight, sound, smell, taste, and touch. The feelings component may include joy, anger, sorrow, fear, and disgust. The thoughts component may include personal experience, adapted experience, influenced thoughts, learned values, and convictions/judgement. The questions may address subjects (such as cooking, playing, working, drawing, building, pets, dreams, etc.) or objects (such as video games, sports, equipment, or other material things, etc.) to the user's five senses (sensory), human emotions (feelings), and/or discretionary ability based on knowledge (thoughts). This question forming approach builds an unending supply of questions and may provide the opportunity for users to accept or reject the questions and the AI and machine learning model to learn from the user's behavior and answers, as opposed to a team of psychologists defining what could be "right." This question forming approach ensures an unending supply of questions, discern the questions market acceptance quickly and learn/adapt quickly.

At step 330, the career planning system 200 and/or the career planning server 100 may receive answers to the questions in the answer interface. The answer interface may not include YES or NO answers to questions and may not include scoring answers using, for example 1-5 scores. The answer interface may be a question that the user ranks each of the different answers, putting each of the number of answers in rank order. The user may rank the different answers my moving the answers up or down in rank order. For example, the user may receive three or more answers that the user rank orders. In another example, the user may receive four or five or more answers that the user rank orders.

At step 340, the career planning system 200 and/or the career planning server 100 may generate, calculate, and score a pillar result or life vector for the user. The pillar result may be a scoring profile for each of the various life vectors, pillar results and/or characteristics. The career planning system 200 and/or the career planning server 100 may use an artificial intelligence (AI) and machine learning (ML) algorithm model to quantify the answers given by the user. The career planning system 200 and/or the career planning server 100 may determine a score for each of the pillar results. The score may define a score profile on a positive scale, such as from 0 to 100, to uplift the user.

The career planning system 200 and/or the career planning server 100 may utilize human test prediction models and standard deviation capability proving a 4-factorial ranking to calculate and determine the pillar results from the user's answers to the questions via the answer interface. The generation, calculation, and score of the pillar result for the user may be divided into five different steps.

First step, for example, the career planning system 200 and/or the career planning server 100 may provide a mean calculation of the answers, with different answers having different weightage for each of the different pillar results. In an exemplary embodiment, there may be four pillar results. In other exemplary embodiments, there may be more or less than four pillar results. The weightage of the answers may be first set at the backend of the career planning system 200 and/or the career planning server 100. After iterations by the users, the weightage of the answers may be back-calculated and changed by the AI algorithm based on the machine learning model.

Second step, the career planning system 200 and/or the career planning server 100 may calculate the standard deviation between answers for each set of questions. The change in the answer set (i.e. change in weightage of two sets of answers for two different question) and the change in answers range for the same question may be calculated to find deviations in choices for the users.

Third step, the career planning system 200 and/or the career planning server 100 may feed the standard deviation into the AI system to minimize the standard deviation over a regression minimum residual curve.

Fourth step, the career planning system 200 and/or the career planning server 100 and the AI system may change the calculated weights for all four pillars/results over different iterations by users. Those weights may then be used to convert in a scale of a score, such as 0-100 to quantify each of the four pillar results. These scores and pillar results may then be displayed and shown to the end users.

Fifth step, the career planning system 200 and/or the career planning server 100, depending on the user's scores, will execute and run a matching algorithm. The matching algorithm may match the value of each of the four pillar results and determine and display a quantified table. The quantified table may show a combination of each of the four pillar results based on all of the pillar results for the four pillars and their linear combinations.

Below shows an exemplary calculation of a pillar/characteristic score. First, let "A" fill the quiz and answer 4 questions (which had options ABCD with different weightage for all 4 different questions). Weightage are on the scale of 1-10. Q1—Answers Choice (B1A1C1D1)—Weightage—A1=3, B1=4, C1=6, D1=9. Q2—Answers Choice (A2B2C2D2)—Weightage—A2=1, B2=2, C2=5, D2=7. Q3—Answers Choice (C3B3D3A3)—Weightage—A3=5, B3=6, C3=7, D3=9. Q4—Answers Choice (D4A4C4B4)—Weightage—A4=9, B4=2, C4=5, D4=4. In this pattern, for example, assume the questions were filled out by 10 or more users.

Step 1—Mean of Q1+Q2+Q3+Q4 (Preferred choices)—B1+A2+C3+D4.

Step 2

Feed the calculations into machine learning/ANN Model.

Weightage Calculation—Output—Q1—B1=3.6, C1=7, D1=8 . . . . Similarly, for A2, A3, A4, B2 . . . D4.

Feed it into the system and repeat calculation 1.

Step 3—

Calculate Standard Deviation (SD) between answers—Q1—SD between options—(A1, B1, C1, D1).

Calculate Standard deviation (SD) between Questions (Q1, Q2, Q3, Q4).

Feed into the system to optimize the standard deviation over the mean squared error curve on real data.

Step 4—

For example, there are four questions for each of the four pillar results—

Calculate and determine a mean value to 7, 8, 10 and 1 for each of the four pillar results—transform this number onto a scale of 100 and project it as 70, 80, 100 and 10.

These numbers may be a calculated real value up to a decimal point of 10 or more, and may be extended when more users are using the career planning system 200.

Step 5—

Four Measures, four pillar results—a set of combinations can be made with 4 pillar results. Depending on four pillar results, the career planning system 200 and/or the career planning server 100 will execute and run a matching algorithm that may match the pillar results to a set of courses/vocational/schools/programs/majors, etc.

Over a period of time, on the behavior of users, the career planning system 200 and/or the career planning server 100 may cluster users and show a proportion of users choosing the same preferences to improve accuracy and efficiency of the matches.

At step 350, the career planning system 200 and/or the career planning server 100 may scrape websites for career planning options for the pillar results. The career planning system 200 and/or the career planning server 100 may utilize the AI and ML algorithm model to scrape websites for best possible career planning options for the pillar results of the user.

At step 360, the career planning system 200 and/or the career planning server 100 may match the pillar results with the career planning options. The career planning options may include one or more of the following: courses, colleges, universities, programs, majors, careers, jobs, and/or companies. The career planning system 200 and/or the career planning server 100 may utilize the AI and ML algorithm model may be based on various age groupings of the user to determine what the user needs and various career planning options, such as: course recommendations, college recommendations, college course recommendations, major/program recommendations, career field recommendations, job recommendations, and/or company recommendations. The career planning system 200 and/or the career planning server 100 may be utilized to cover various stages of the life of a user from middle school through retirement. The career planning system 200 and/or the career planning server 100 may utilize the AI and ML algorithm model to match the pillar results and scores with the possible career planning options and utilizing filters depending on various factors, such as major, skills, career, universities, etc. For the matching portion, the career planning system 200 and/or the career planning server 100 may use a scoring band of the scores and the scoring profile to help find matches, such as for a score of 70, use a band of 65-75.

At step 370, the career planning system 200 and/or the career planning server 100 may output and/or display each of the pillar results. The pillar results may display a score using a band of scores for each pillar and/or characteristic. The career planning system 200 and/or the career planning server 100 may display each of the pillar results on a display of the mobile device or the computing device.

At step 380, the career planning system 200 and/or the career planning server 100 may output and/or display the career planning options. The career planning options may include one or more of the following: courses, colleges, universities, programs, majors, careers, jobs, and/or companies. The user may filter the career planning options by various features, such as: location with colleges around the user; college entrance scores (SAT/ACT/grades), to include median, mean, top 75%, top 25%, etc.; cost by filtering and sorting by costs. The career planning system 200 and/or the career planning server 100 may display other information and list other information about the career planning options, such as for schools—loans available, scholarships available, links to the college websites, links to the applications, list application requirements, etc.

Additionally, the career planning system 200 and/or the career planning server 100 may output to the user various weblinks to additional information. In one example, the career planning system 200 and/or the career planning server 100 may provide a weblink to a course, wherein if the user clicks on the course, the career planning system 200 and/or the career planning server 100 provides the user with a description of the course and a listing or write up of colleges that may offer this course.

Figure 4:
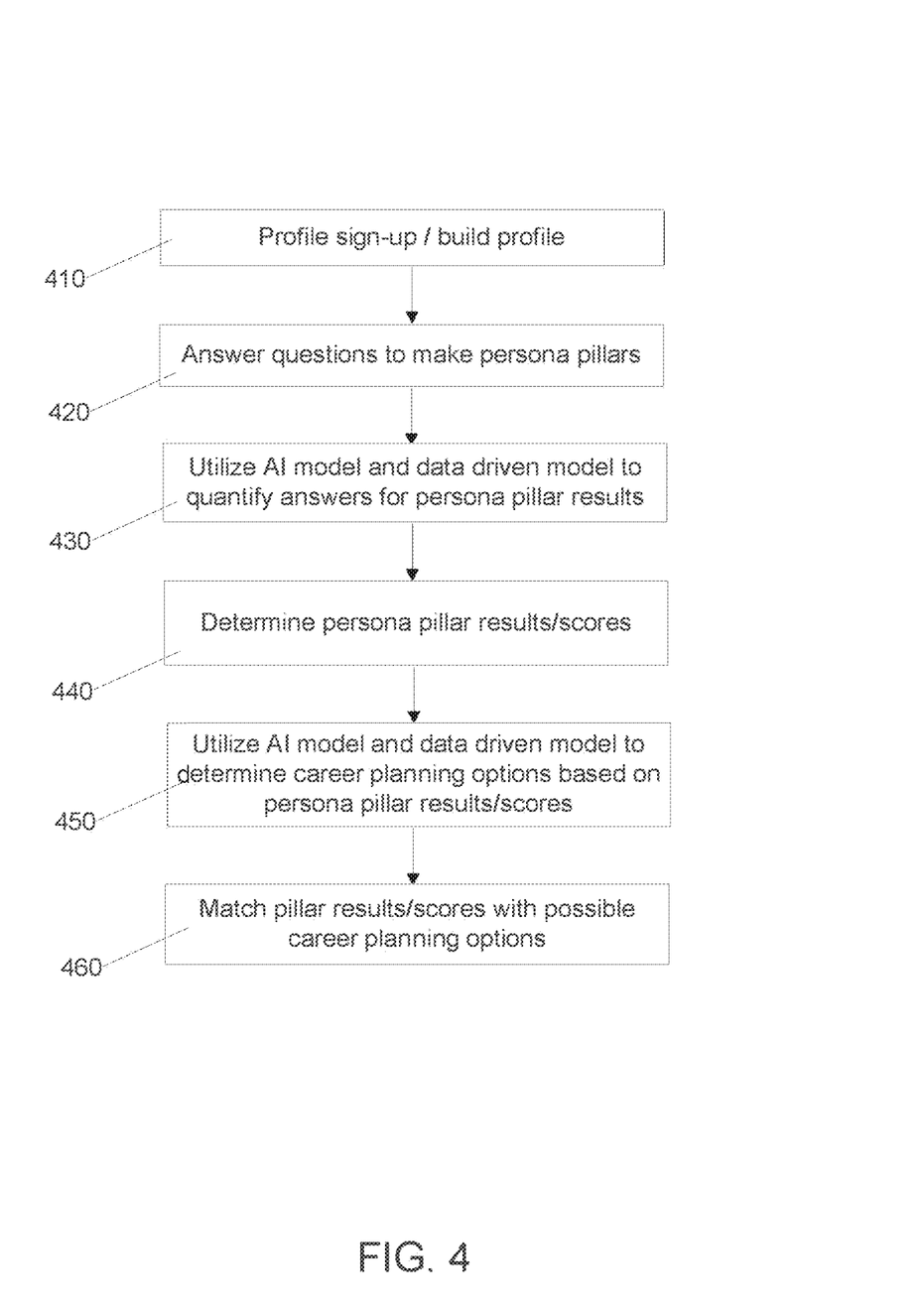
FIG. 4 illustrates another exemplary method for the career planning system in accordance with one or more aspects described herein.

FIG. 4 illustrates and example method 400 according to an embodiment as disclosed herein. In some embodiments, method 400 may be performed by the career planning system 200 and/or the career planning server 100. It should be understood that the method of FIG. 4 is designed to illustrate various features and aspects of the system, and not to limit the functionality of the system.

At step 410, the user may complete a profile sign-up and/or build a user profile in the career planning system 200 and/or the career planning server 100. The user may access a career planning application 221 that operates on a mobile device and/or computing device that is connected to the career planning system 200 and/or the career planning server 100. The career planning system 200 and/or the career planning server 100 may ask general questions and/or provide a web form to build a personal profile for the users, for example, name, email, gender, age, current school, etc.

At step 420, the user may answer questions to create persona pillars in the career planning system 200 and/or the career planning server 100. The user may access the questions via the career planning application 221 operating on the mobile device and/or computing device connected to the career planning system 200 and/or the career planning server 100. The career planning system 200 and/or the career planning server 100 may present a quiz, a series of questions, and/or a test to the user. Based on the answers to these questions, the career planning system 200 and/or the career planning server 100 may begin to make and/or determine a pillar result or an outcome of a plurality of persona pillars or characteristics for the user. In one example, the plurality of persona pillars will include four persona pillars.

At step 430, the career planning system 200 and/or the career planning server 100 may utilize an artificial intelligence (AI) model and a data driven and/or machine learning model to quantify the answers from the user for persona pillar results. The career planning system 200 and/or the career planning server 100 may determine a score for each of the persona pillars. The score may define a user persona on a positive scale, such as from 0 to 100, to uplift the user. The career planning system 200 and/or the career planning server 100 may utilize human test prediction models and standard deviation capability proving a 4-factorial ranking to calculate and determine the pillar results from the user's answers to the questions via the answer interface. The generation, calculation, and score of the pillar result for the user may be divided into five different steps.

At step 440, the career planning system 200 and/or the career planning server 100 may determine persona pillar results and scores. The career planning system 200 and/or the career planning server 100 may utilize human test prediction models and standard deviation capability proving a 4-factorial ranking to calculate and determine the pillar results from the user's answers to the questions via the answer interface. The generation, calculation, and score of the pillar result for the user may be divided into five different steps as is described above for step 340.

At step 450, the career planning system 200 and/or the career planning server 100 may utilize the AI model and the data driven and/or machine learning model to determine career planning options based on the persona pillar results and scores. The career planning system 200 and/or the career planning server 100 may utilize the AI and ML algorithm model to scrape websites for best possible career planning options for the pillar results of the user.

At step 460, the career planning system 200 and/or the career planning server 100 may match the pillar results and scores with career planning options. The career planning options may include one or more of the following: courses, colleges, universities, programs, majors, careers, jobs, and/or companies. The career planning system 200 and/or the career planning server 100 may utilize the AI and ML algorithm model to match the pillar results and scores with possible outcomes and utilizing filters depending on various factors, such as major, skills, career, universities, etc. For the matching portion, the career planning system 200 and/or the career planning server 100 may use a scoring band of the scores and the scoring profile to help find matches, such as for a score of 70, use a band of 65-75. The career planning system 200 and/or the career planning server 100 may map scoring profiles to different jobs, careers, majors, programs, and/or courses by scraping various websites mining for information.

Figure 5:
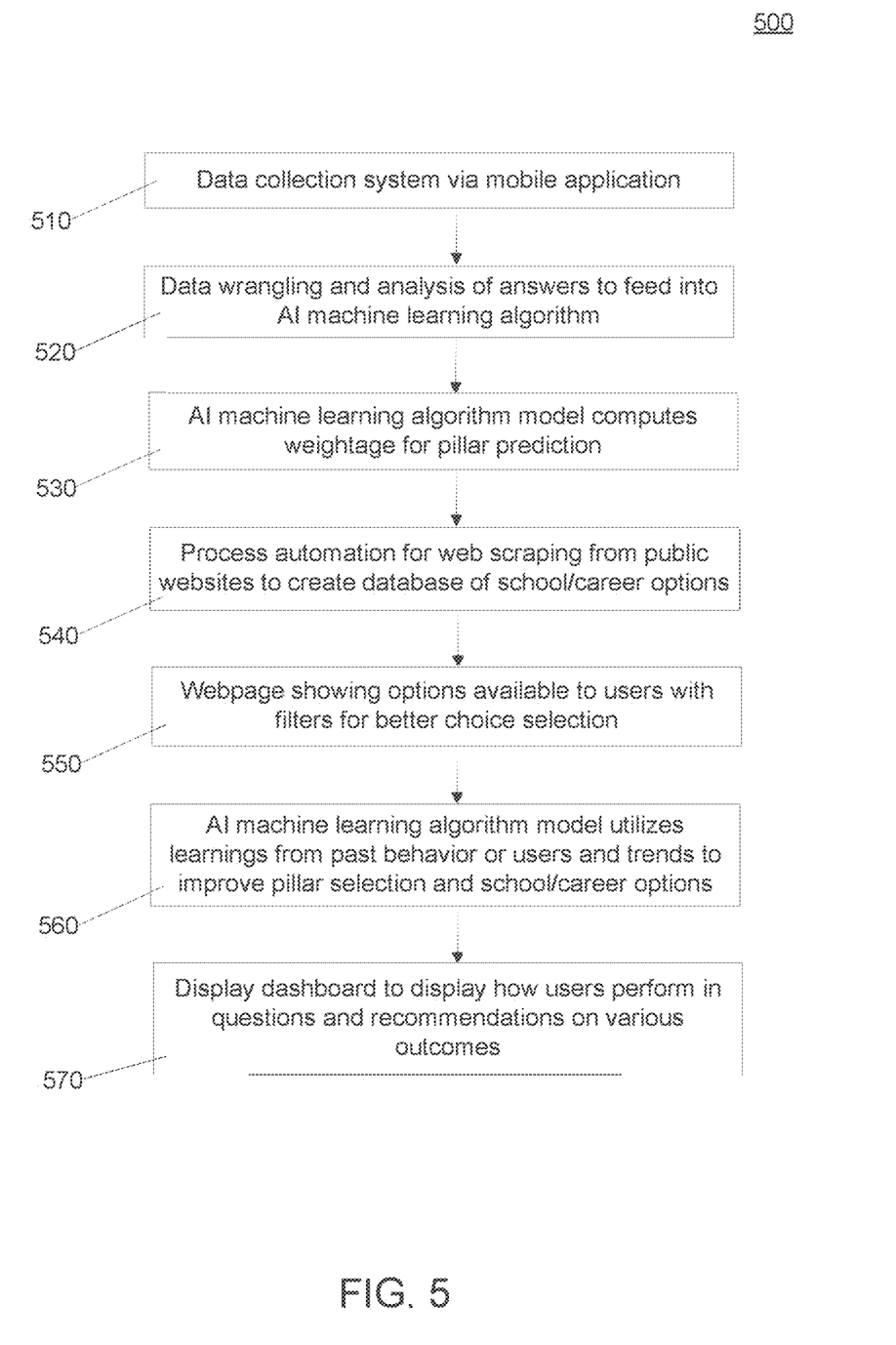
FIG. 5 illustrates another exemplary method for the career planning system in accordance with one or more aspects described herein.

FIG. 5 illustrates and example method 500 according to an embodiment as disclosed herein. In some embodiments, method 500 may be performed by the career planning system 200 and/or the career planning server 100. It should be understood that the method of FIG. 5 is designed to illustrate various features and aspects of the system, and not to limit the functionality of the system.

At step 510, the career planning system 200 and/or the career planning server 100 may include a data collection system via a mobile application or career planning application 221. The mobile application may operate and execute on a mobile device, such as an Android or Apple phone. The mobile application may operate and execute on other computing devices.

At step 520, the career planning system 200 and/or the career planning server 100 may utilize data wrangling and analysis of answers to feed into an artificial intelligence (AI) machine learning algorithm model.

At step 530, the career planning system 200 and/or the career planning server 100, using the AI machine learning algorithm model, may compute a weightage for pillar prediction. The AI machine learning algorithm model may be an artificial neural network (ANN) to compute weightage for better pillar/characteristic prediction. The career planning system 200 and/or the career planning server 100 may utilize human test prediction models and standard deviation capability proving a 4-factorial ranking to calculate and determine the pillar results from the user's answers to the questions via the answer interface. The generation, calculation, and score of the pillar result for the user may be divided into five different steps as is described above for step 340.

At step 540, the career planning system 200 and/or the career planning server 100 may provide process automation for web scraping from public websites to create one or more databases of different career planning options. The career planning system 200 and/or the career planning server 100 may pull data and information from universities that define and provide regarding people in particular majors fit particular personality types. Additionally, the career planning system 200 and/or the career planning server 100 may also pull data and match outputs to data from universities regarding the people with similar people and the courses they choose. The career planning options may include one or more of the following: courses, colleges, universities, programs, majors, careers, jobs, and/or companies.

At step 550, the career planning system 200 and/or the career planning server 100 may provide one or more webpages and/or webpage links to the users showing the career planning options. The career planning options may include various filtering for better choice selection and viewing by the user.

At step 560, the career planning system 200 and/or the career planning server 100, using the AI machine learning algorithm model, may utilize learning from past behaviors, users, and trends to improve pillar selection and career planning options.

At step 570, the career planning system 200 and/or the career planning server 100, may display a dashboard to display how users perform in the questions and the pillar results. The dashboard may also include recommendations on various outcomes and career planning options, such as for example, courses, colleges, universities, programs, majors, careers, jobs, and/or companies. For example, for high school level users, the career planning options may include recommendations for electives and/or courses at a high school level. For example, for college level users (or upcoming college users), the career planning options may include recommendations for careers, best colleges for those careers, majors and/or programs for those careers, courses for those careers, matching the careers to the classes and/or careers and/or majors, location of the colleges. The career planning options may include many other filters utilized for the colleges, such as costs of colleges, college location as compared to a home location, "reputation" score, grade point average/minimum, standardized test score average/minimum, etc.

Figure 6:
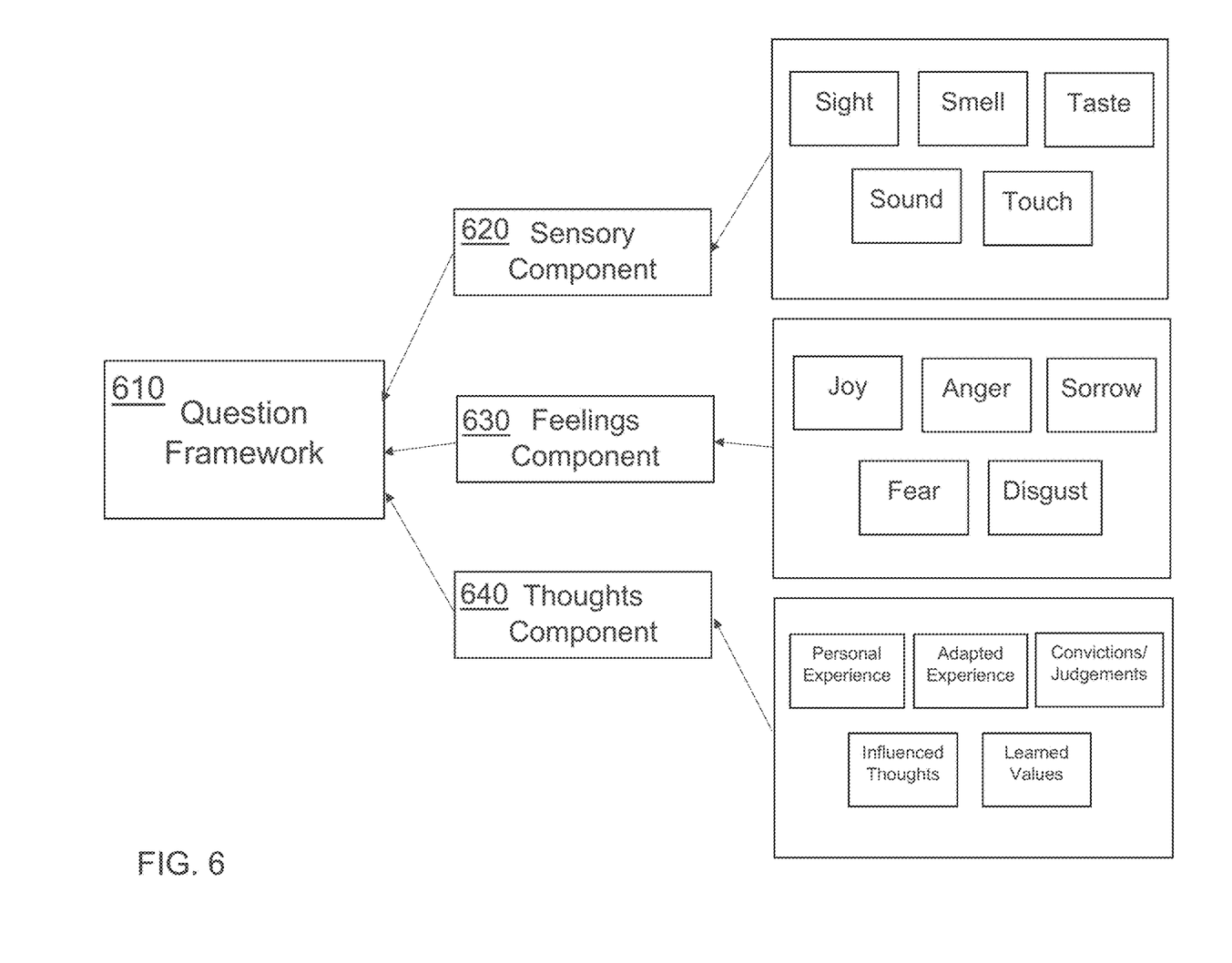
FIG. 6 illustrates another exemplary method for the career planning system in accordance with one or more aspects described herein.

FIG. 6 illustrates and example method 600 according to an embodiment as disclosed herein. In some embodiments, method 600 may be performed by the career planning system 200 and/or the career planning server 100. It should be understood that the method of FIG. 6 is designed to illustrate various features and aspects of the system, and not to limit the functionality of the system.

At step 610, the career planning system 200 and/or the career planning server 100 may include a question framework of the plurality of questions. The plurality of questions may be based on three core components of human behavior that include a sensory component 620, a feelings component 630, and a thoughts component 640. The sensory component 620 may include questions related to sight, sound, smell, taste, and touch. The feelings component 630 may include questions related to joy, anger, sorrow, fear, and disgust. The thoughts component 640 may include questions related to personal experience, adapted experience, influenced thoughts, learned values, and convictions/judgement. Further, the system may calculate and determine a percent confidence level for each of the plurality of career planning options.

The career planning system 200 and/or the career planning server 100 may utilize various technical solutions that may be open-source packages available. The career planning system 200 and/or the career planning server 100 may load datafile into the career planning server 100 and convert the datafiles into a dataframe, using for example, Numpy or Pandas, or a technical solution similar to that. The career planning system 200 and/or the career planning server 100 may plot trends of the dataframe converted by the loading of the datafiles, using for example Matplotlib or Seaborn, or a technical solution similar to that. The career planning system 200 and/or the career planning server 100 may run a ML model (such as ANN) to predict weightage of answers for better pillar result prediction, using for example PyTorch, or a technical solution similar to that. The career planning system 200 and/or the career planning server 100 may run training set on the ML model (such as ANN) and fine tune hyperparameter for faster runtimes of the ML model, using for example Tensorflow, or a technical solution similar to that. The career planning system 200 and/or the career planning server 100 may find best possible algorithms with available datasets, using for example Scikit Learn, or a technical solution similar to that. The career planning system 200 and/or the career planning server 100 may run web scraping on websites to gather data available to the public related to any career planning options, using for example Beautiful Soup, or a technical solution similar to that. The career planning system 200 and/or the career planning server 100 may gather web scraped data and present it in a tabular form for better visualization, using for example Scrappy, or a technical solution similar to that. Additionally, the career planning system 200 and/or the career planning server 100 may utilize a Mobile App server to save local data on the app. Additionally, the career planning system 200 and/or the career planning server 100 may use MongoDB server (or a similar technical solution) to save data from local mobile app server onto main server, i.e. MongoDB Atlas (which is a cloud-based server). Additionally, the career planning system 200 and/or the career planning server 100 may run Azure (or a similar technical solution) for data hosting server for MongoDB.

The career planning options may include one or more of the following: courses, colleges, universities, programs, majors, careers, jobs, and/or companies. The user may filter the career planning options by various features, such as: location with colleges around the user; college entrance scores (SAT/ACT/grades), to include median, mean, top 75%, top 25%, etc.; cost by filtering and sorting by costs. The career planning system 200 and/or the career planning server 100 may display other information and list other information about the career planning options, such as for schools—loans available, scholarships available, links to the college websites, links to the applications, list application requirements, etc.

In accordance with this invention, the pillars or persona pillars may include four different characteristics. Other numbers of characteristics, pillars, or persona pillars may be utilized without departing from this invention. One example set of pillars or characteristics that may be used are: passion, outlook, love, and wealth. Another example set of pillars or characteristic that the career planning system 200 and/or the career planning server 100 may utilize are: spirit, profession, purpose, and reward. For example, the spirit pillar or spirit life vector may be based on why the user would want to address a subject or an object. The profession pillar or profession life vector may be based on when the user might prioritize or re-prioritize their vocation/skills. The purpose pillar or purpose life vector may be based on who the user might consider prioritizing your values for. The reward pillar or reward life vector may be based on aligning the materialistic why the user might consider any changes to the user's approach.

In accordance with this invention, the career planning system 200 and/or the career planning server 100 may match a user with celebrities or others known in a field/major/courses that is provided to the users. The career planning system 200 and/or the career planning server 100 may match the pillar results of a user with one or more celebrities—to tell the user what celebrities they are most like.

In accordance with this invention, the career planning system 200 and/or the career planning server 100 may utilize machine learning models for data analysis utilizing various factors when analyzing the answers from the users and comparing those factors to other users. For example, the career planning system 200 and/or the career planning server 100 may measure and record the time for the user to answer each question. The career planning system 200 and/or the career planning server 100 may also record items or factors such as geography of the user, time of day for answering the questions, day of the week for answering the questions, age of the user, and/or gender of the user. The career planning system 200 and/or the career planning server 100 may also record any skipped answers and/or skipped questions for the user. Using all of these factors, the machine learning models for the career planning system 200 and/or the career planning server 100 may analyze, compare, and utilize artificial intelligence with the machine learning model for the user and other users within the system.

In accordance with this invention, the career planning system 200 and/or the career planning server 100 may calculate and determine a percent confidence level for each of the items on the career planning options. The career planning system 200 and/or the career planning server 100 may display and output the percent confidence level to the user for each of the career planning options.

In accordance with the invention, the career planning system 200 and/or the career planning server 100 may utilize the AI and machine learning models to analyze historical information of what a user actually chooses and comparing the career planning option recommendations provided to the user.

In accordance with the invention, the career planning system 200 and/or the career planning server 100 may be utilized within the hiring and/or recruiting markets. For example, the career planning system 200 and/or the career planning server 100 may be utilized to assist with interviewees, such as assisting with answering questions based on your persona and history. Additionally, the career planning system 200 and/or the career planning server 100 may assist with matching and fitting for both interviewees and interviewers between job applicants and hiring companies and/or recruiting companies. Additionally, the hiring and/or recruiting markets may utilize the tests and/or quizzes and history of answers for the tests and/or quizzes as provided by the career planning system 200 and/or the career planning server 100. For example, fifty potential applicants may all take the tests and/or quizzes provided by the career planning system 200 and/or the career planning server 100 and provide the results to the companies to easily potentially filter down the fifty applicants.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
   a career planning server;
   a mobile application connected to the career planning server and executing on a mobile device having at least one processor;
   a display with a user interface on the mobile device; and
   a memory unit storing computer-executable instructions, which when executed by the processor, cause the system to:
   receive, by the mobile application, login information from a user, wherein the login information is received through the mobile device;
   create a personality quiz including a plurality of questions, wherein the plurality of questions includes an answer interface with a plurality of answers, wherein the user ranks each of the answers on the user interface by putting each of the answers in a rank order, wherein the user receives three or more answers that the user rank orders;
   receive, by the mobile application, the plurality of answers from the answer interface;
   generate and calculate, using a machine learning algorithm model executing on the career planning server, a score for each of a plurality of personality pillar results based on the plurality of answers from the user, wherein the machine learning algorithm model calculates and generates the score by calculating a mean value for the plurality of answers having different weightage for each of the different personality pillar results, the machine learning algorithm model calculates a standard deviation between the answers attributed to each of the plurality of questions, and the machine learning algorithm model feeds the standard deviation back into the algorithm to minimize the standard deviation over a regression minimum residual curve and improves the machine learning algorithm model by changing the weightage of the answers to the questions as used in the algorithm based on reinforcement learning;
   scrape, using the machine learning algorithm model executing on the career planning server, a plurality of career planning options from a plurality of websites, wherein the plurality of career planning options includes one or more of the following: courses, majors, programs, or colleges;
   match, using the machine learning algorithm model executing on the career planning server, the scores for each of the plurality of personality pillars and the plurality of career planning options;
   display, on the user interface of the mobile device, the scores for each of the plurality of personality pillars; and
   display, on the user interface of the mobile device, the plurality of career planning options.

2. The system of claim 1, wherein the user rank orders the plurality of answers by moving one or more of the answers up or down on the answer interface.

3. The system of claim 1, wherein the scores for each of the plurality of personality pillars is calculated using a standard deviation with a four-factorial calculation.

4. The system of claim 1, wherein the plurality of personality pillars are Spirit, Profession, Outlook, and Reward.

5. The system of claim 1, wherein the displaying of the plurality of career planning options is filtered using one or more of the following: location, entrance scores, or costs.

6. The system of claim 1, wherein the plurality of questions is based on three core components of human behavior that include a sensory component, a feelings component, and a thoughts component.

7. The system of claim 6, wherein the sensory component includes questions related to sight, sound, smell, taste, and touch.

8. The system of claim 6, wherein the feelings component includes questions related to joy, anger, sorrow, fear, and disgust.

9. The system of claim 6, wherein the thoughts component includes questions related to personal experience, adapted experience, influenced thoughts, learned values, and convictions/judgement.

10. The system of claim 1, wherein the memory unit storing computer-executable instructions, which when executed by the processor, further cause the system to:
calculate and determine a percent confidence level for each of the plurality of career planning options.

11. A computer-implemented method comprising:
receiving, through a mobile application executing on a mobile device having at least one processor, login information from a user, wherein the login information is received through the mobile device;
creating, by a career planning server connected to the mobile device, a personality quiz including a plurality of questions, wherein the plurality of questions includes an answer interface with a plurality of answers, wherein the user ranks each of the answers on the user interface by putting each of the answers in a rank order, wherein the user receives three or more answers that the user rank orders;
receiving, by the mobile application, the plurality of answers from the answer interface;
generating and calculating, using a machine learning algorithm model executing on the career planning server, a score for each of a plurality of personality pillar results based on the plurality of answers from the user, wherein the machine learning algorithm model calculates and generates the score by calculating a mean value for the plurality of answers having different weightage for each of the different personality pillar results, calculates a standard deviation between the answers attributed to each of the plurality of questions, and feeds the standard deviation back into the algorithm to minimize the standard deviation over a regression minimum residual curve and improves the machine learning algorithm model by changing the weightage of the answers to the questions as used in the algorithm based on reinforcement learning;
scraping, using the machine learning algorithm model executing on the career planning server, a plurality of career planning options from a plurality of websites, wherein the plurality of career planning options includes one or more of the following: courses, majors, programs, or colleges;
matching, using the machine learning algorithm model executing on the career planning server, the scores for each of the plurality of personality pillars and the plurality of career planning options;
displaying, on a user interface of the mobile device, the scores for each of the plurality of personality pillars; and
displaying, on the user interface of the mobile device, the plurality of career planning options.

12. The method of claim 11, wherein the user rank orders the plurality of answers by moving one or more of the answers up or down on the answer interface.

13. The method of claim 11, wherein the scores for each of the plurality of personality pillars is calculated using a standard deviation with a four-factorial calculation.

14. The method of claim 11, wherein the plurality of personality pillars are Spirit, Profession, Outlook, and Reward.

15. The method of claim 11, wherein the displaying of the plurality of career planning options is filtered using one or more of the following: location, entrance scores, or costs.

16. The method of claim 11, wherein the plurality of questions is based on three core components of human behavior that include a sensory component, a feelings component, and a thoughts component.

17. The method of claim 16, wherein the sensory component includes questions related to sight, sound, smell, taste, and touch.

18. The method of claim 16, wherein the feelings component includes questions related to joy, anger, sorrow, fear, and disgust.

19. The method of claim 16, wherein the thoughts component includes questions related to personal experience, adapted experience, influenced thoughts, learned values, and convictions/judgement.

20. The method of claim 11, further including the step of:
calculating and determining a percent confidence level for each of the plurality of career planning options.

* * * * *